Figure 1:
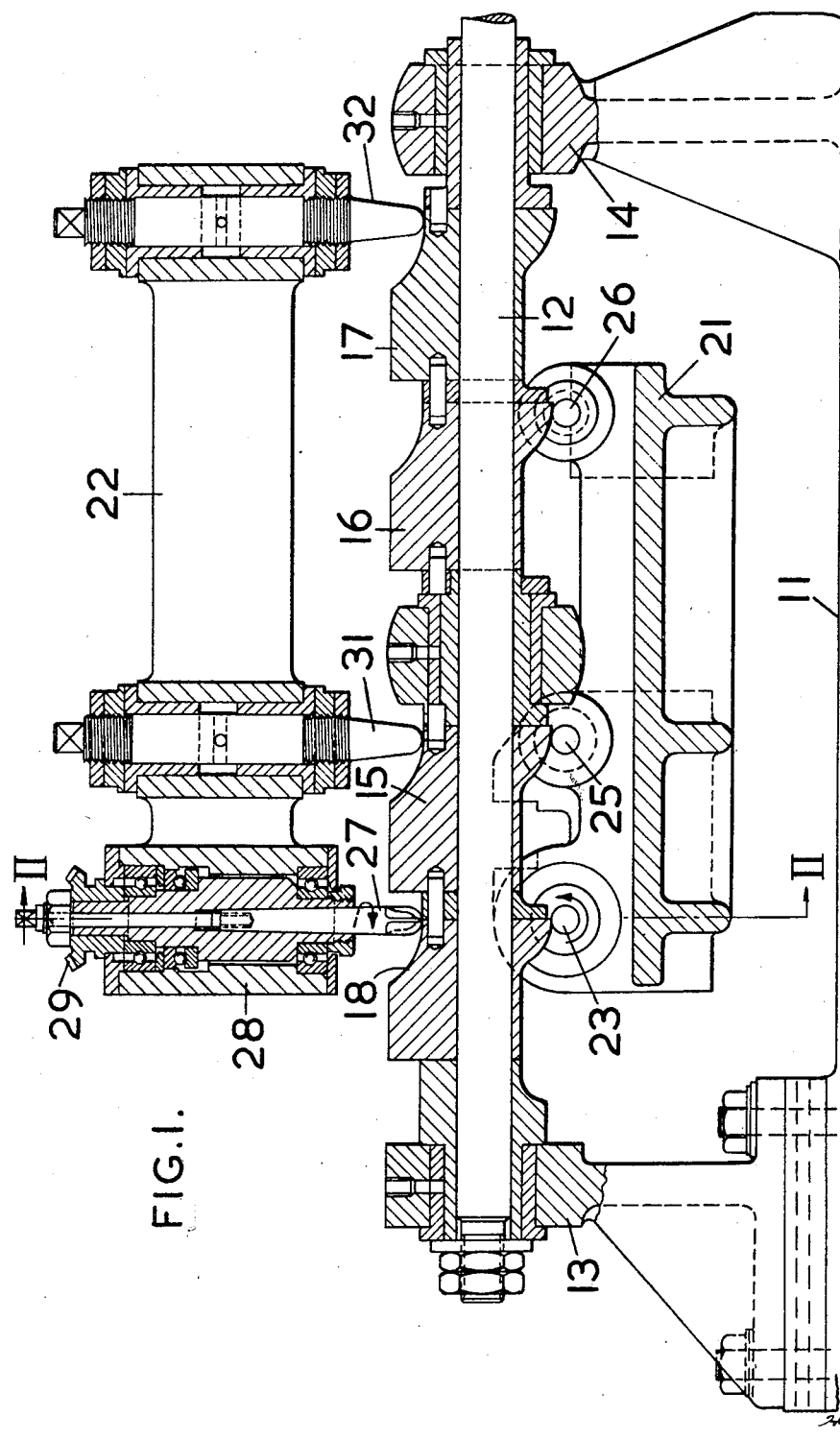

May 16, 1950 C. PERRY 2,507,734
PROFILING MACHINE
Filed March 21, 1947 2 Sheets-Sheet 1

INVENTOR
CHARLES PERRY
By Haseltine Lake & Co.
Agents

May 16, 1950 C. PERRY 2,507,734
PROFILING MACHINE
Filed March 21, 1947 2 Sheets-Sheet 2

INVENTOR
CHARLES PERRY
BY Haseltine, Lake & Co.
Agents

Patented May 16, 1950

2,507,734

UNITED STATES PATENT OFFICE 2,507,734

PROFILING MACHINE

Charles Perry, Bexley, England, assignor to Vickers-Armstrongs Limited, London, England, a British company Application March 21, 1947, Serial No. 736,172
In Great Britain March 18, 1946

Section 1, Public Law 690, August 8, 1946
Patent expires March 18, 1966

6 Claims. (Cl. 90—13.7)

This invention relates to profiling machines for the machining of articles of irregular peripheral profile that are adapted to be tooled while being rotated about their axes, as for example peripheral cams and the blades of propellers.

The invention is particularly applicable to profiling machines of the type described in the following terms, namely: a profiling machine comprising a cutter-frame adapted to hold a rotary peripherally-cutting cutter and to hold also a tracing guide member which is formed as a solid of revolution or a portion of such a solid and is of substantially the same radius as the said rotary cutter which cutter and which tracing guide member are arranged with their axes parallel to one another, the said cutter-frame being relatively oscillatably associated with a base provided with means for supporting upon a common axis a master cam and a cam blank and rotating them simultaneously at the same angular speed, the cutter-frame being provided with feeding means adapted to move it axially of the said master cam and cam blank, the arrangement being such that the said tracing guide member and rotary cutter ultimately bear upon the master cam and cam blank respectively, when by floating motion of the cutter frame the tracing guide member as it co-operates with the master cam limits and guides the cutter in its approach to the cam blank so that the blank is cut to a profile that corresponds to the profile of the master cam.

Relative to the axis on which the cam blank is mounted, revolving cutters may be mounted in three different ways: (1) with their axes parallel to the axis on which the cam blank is mounted, (2) with their axes transverse to and passing over the axis on which the cam blank is mounted, or (3) with their axes substantially radial to the axis on which the cam blank is mounted, and in this latter case cutting can only be effected by the end of the cutter. The first of these three ways of mounting is well adapted to forming peripheral profiles derived from gradually changing radii, whether the contours be convex or concave, but cannot be used for cutting sharply changing concave contours. The second way is the best and most efficient for cutting convex profiles, but cannot be used for concave profiles and, finally, the third way is the only practicable one for sharply changing profiles whether convex or concave, but is ill-adapted for use on gradually changing profiles as the tool has of necessity a small operative cutting edge if it is desired to apply it for cutting sharply changing profiles, and consequently the edge wears comparatively quickly. It will of course be obvious, that it is difficult to cut a cam accurately with a cutting tool having a cutting edge which wears quickly.

It is therefore a primary aim of the present invention to improve the cam profiling machine of the type described, so that as much as possible of the surface of the cam blank is cut with a cutter or cutters mounted in the first and/or second ways previously mentioned, whilst a cutter mounted in the third way can be used only on the surfaces which cannot be cut by cutters mounted in the first and second ways.

The improvements to a machine of the type described are effected by associating therewith at least one control cam, additional to the said master cam, which control cam is disposed on the said common axis; it may conveniently be mounted on the cam mandrel. The additional control cam or cams manipulate suitable cutters through the intermediary of associated tracing guide members. The cutters and tracing guide members work in conjunction, separately simultaneously, or interchangeably as required, in such a manner as jointly to cut the cam profile on a blank completely at one operation. In this way it is possible, generally speaking, to make mechanically an accurate copy of any peripheral cam, or other shaped surface turning about a given axis, which cannot be cut by known simpler means. There are, however, exceptions to this possibility. Peripheral cams with straight-sided axial grooves, for instance, are excluded.

To carry the invention into effect, two or more pivoted cutter-frames are mounted in the manner described in connection with our previous patent application Serial No. 544,414 filed July 11, 1944, and now Patent No. 2,456,146, granted Dec. 14, 1948, quite independently of each other, and each is controlled as regards its limiting cutting position at any point of the axial traverse by a master cam and an associated tracing guide member.

The type of cutter and tracing guide member will vary with the requirements, but each pivoted cutter-frame is provided with a cutter and a tracing guide member adapted to deal with the portions of the profile appropriate to them, the complete profiled surface being produced at one operation by two or more cutters operating on it.

At predetermined points appropriate to the surface being cut, it is necessary to put out of action and keep out of action for a determinate period one or more of the operative cutters. For this purpose, in accordance with the invention, at least one control cam distinct from the master cam is mounted on the common mandrel axis and revolved therewith, the shape of such a control cam being determined only by the requirements of manipulating the cutter-frames, and their associated members, so as to put these in and out of possible contact with the master cam to a degree required by the profile and at the proper time, additional tracing guide members being provided on the pivoted cutter-frames to co-operate with these control cams. Such an arrangement provides a perfectly general method of cutting irregular exterior profiles on blanks revolving about an axis.

By way of example a particular embodiment of the invention is now to be described, but it will be readily understood that the invention provides a perfectly general method for the profiling by a single operation of surfaces defined as of variable contour, radially and axially, relatively to a given axis.

Figure 2:
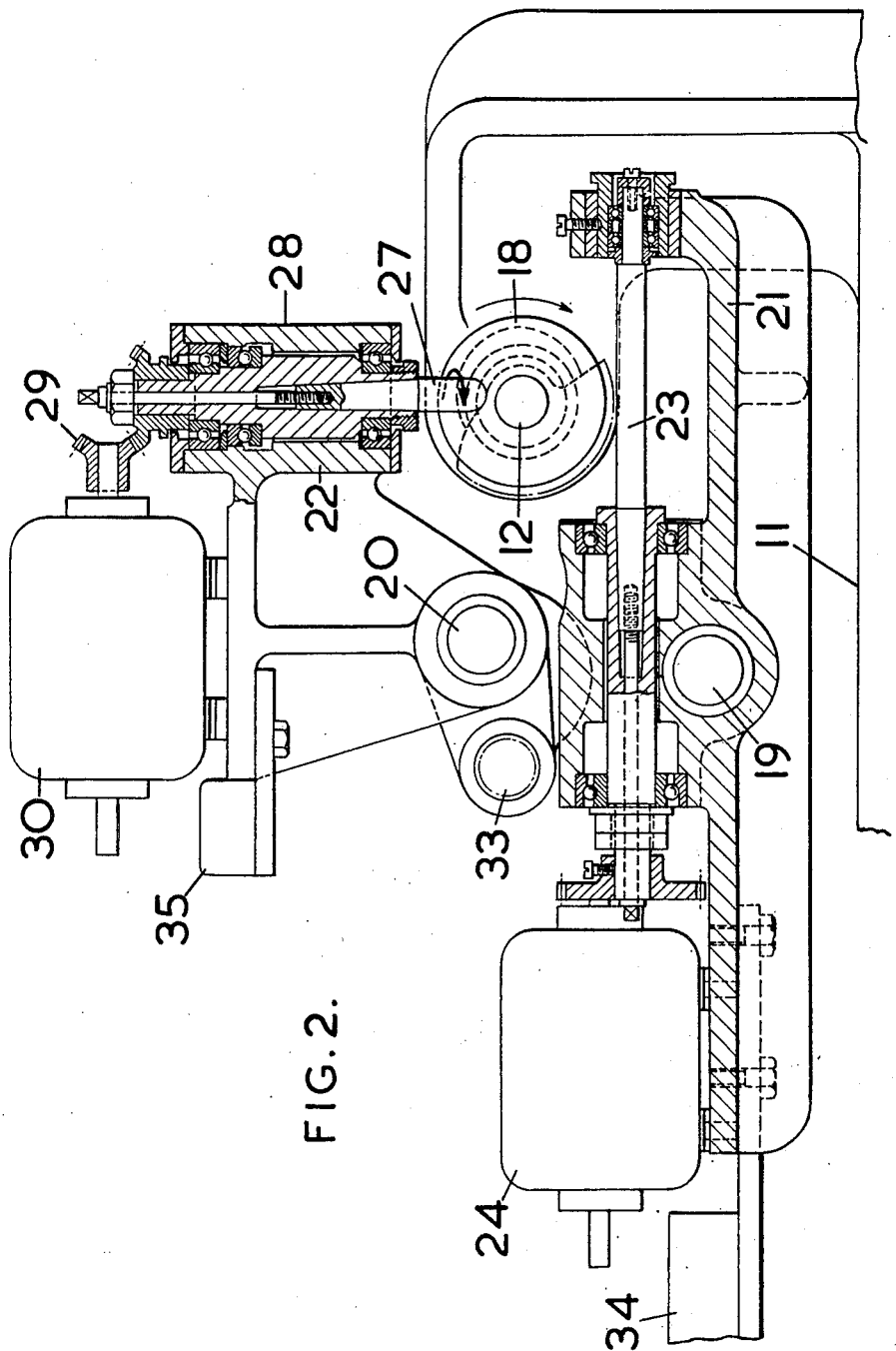

In describing the said embodiment, reference is made to the accompanying drawings, of which:

Figure 1 represents a longitudinal sectional elevation of a cam profiling machine, the section being in the plane of the axis of the cam mandrel; and Figure 2 represents a transverse sectional elevation of the same machine on the line II—II of Figure 1.

Upon a fixed base 11 a cam mandrel 12 is rotatably supported by bearing pedestals 13, 14 and on the mandrel 12 one master cam 15, two control cams 16, 17 as defined, and a cam blank 18 are rigidly mounted, being suitably spaced from one another. Also supported upon the base 11, but rigidly associated therewith, are two cutter-frame axles 19, 20 arranged one above the other and both to one side (the left according to Figure 2) of the cam mandrel 12.

On the cutter-frame axle 19 a cutter-frame 21 is oscillatably mounted, and on the cutter-frame axle 20 is likewise mounted a second cutter frame 22, both cutter-frames 21, 22 being slidable axially of their respective axles 19, 20.

The cutter-frame 21 is on the lower axle 19 of the two axles 19, 20, and holds a peripherally-cutting rotary cutter 23 whose cutting edges are adapted to trace the periphery of a cylinder, the arrangement being such that the cutter 23 is adapted to bridge from below (that is, cross beneath) the cam blank 18 substantially horizontally so as to bear upon this blank upwardly.

The peripherally-cutting cutter 23 is adapted to be directly driven by an electric motor 24 mounted on the cutter-frame 21, the weight of the motor 24 being so distributed as to exert a turning effort upon the cutter-frame 21 in respect of the axle 23 so as to cause the cutter 23 to bear upwardly upon the cam blank 18 for the cutting operation.

Also held in the cutter-frame 21 are two tracing guide members 25, 26 which are cylindrical and of the same diameter as the peripherally-cutting cutter 23 which cutter and tracing guide members are all arranged with their axes parallel to one another. The arrangement is such that the tracing guide members 25, 26 are adapted to bridge the master cam 15 and the control cam 16 from below trans-axially and bear upwardly upon them by virtue of the before-mentioned turning effort.

The cutter-frame 21 and the operative members it carries are similar to the corresponding parts in the machine described in our aforesaid Patent No. 2,456,146, but with the variant features that in the present case the cutter-frame is arranged below the cam mandrel instead of above it and also carries an additional tracing guide member. Therefore, the construction and operation of the cutter-frame 21 and associated parts are not fully described here. Likewise it is unnecessary here to describe fully the construction and operation of the cutter-frame 22, as both form of function correspond closely to what is described in connection with the aforesaid Patent No. 2,456,146.

The cutter-frame 22 is on the upper cutter-frame axle 20, and holds an endwise-cutting rotary cutter, a rose cutter 27 in such a manner that this cutter is adapted to bear endwise upon the cam blank 18 from above, the cutter 27 being disposed substantially vertically and radially of the axis of the cam blank 18. The rose cutter 27 is held in a cutter spindle 28 which is rotatably supported in the cutter-frame 22 and is adapted to be driven through gearing 29 by a second electric motor 30 (Figure 2) mounted on the cutter-frame 22. The weights of the motor 30 and that part of the cutter-frame 22 disposed over the cam mandrel 12 are distributed with a view to providing suitable downward pressure upon the rose cutter 27 to cause this cutter to bear upon the cam blank 18 for the cutting operation.

Also held in the cutter-frame 22 are two tracing guide members 31, 32 (Figure 1) the operative end of each of which is formed with a surface corresponding to that traced by the cutting edges of the rose cutter 27 during rotation. The tracing guide members 31, 32 and the rose cutter 27 are all arranged with their axes parallel to one another. The arrangement is such that the tracing guide members 31, 32 are adapted to bear respectively upon the master cam 15 and the control cam 17 from above.

In the present instance a single feed screw 33 (Figure 2) suitably mounted on the base 11 and driven through gearing (not shown) by the motor 24, serves to effect the traverse of both cutter-frames 21, 22 axially of their axles 19, 20 so that both cutters 23, 27 are traversed longitudinally of the cam mandrel 12.

In association with the two motors 24, 30 adjustable balance weights 34, 35 are provided, to facilitate nice adjustment of the cutting pressure of both cutters 23, 27.

Only in particular cases would a machine be provided with but a single control cam, with which would be associated suitably separated tracing guide members, held respectively by two cutter-frames. Ordinarily two control cams are provided, and two cutter-frames are associated respectively with these two cams. It may be found practicable, on occasion, to provide three cutter-frames on one machine, for use in connection with one cam blank and one master cam, in which case it may be convenient to provide three control cams on the cam mandrel.

By suitably designing the before-mentioned control cam or cams in relation to the profile to be cut upon the cam blank (or more than one cam blank) and providing the necessary associated tracing guide members on the cutter-frames, it can be arranged that cutters of different types are automatically put into operation either simultaneously or alternately as required.

I claim:

1. A cam profiling machine comprising a base having means for rotatably supporting a cam blank, a first cutter frame mounted for oscillation towards and away from the cam blank axis, a rotary cutter and two tracing guide-members on said first cutter frame, said guide-members and cutter being shaped as solids of revolution with substantially the same radii and being disposed with their axes parallel to each other and radial to the axis of the cam blank, a second cutter frame mounted for oscillation towards and away from the cam blank axis, a further rotary cutter and a further tracing guide-member on said second cutter frame, said further cutter and guide-member being shaped as solids of revolution having substantially the same radii and being disposed with their axes parallel to each other and transverse to the axis of the cam blank, whilst being non-coplanar therewith, a master cam contacted by one tracing guide-member of each frame, one control cam contacted by the other tracing guide-member on said first cutter frame means for supporting the said control cam and master cam on the axis of the cam blank, means for rotating the control cam, master cam and cam blank in unison, feeding means for moving the cutter frames longitudinally of the cam blank axis, said control cam having a profile chosen to ensure that the cutter of said first cutter frame can be prevented from cutting the cam blank to permit the cutter on said first cutter frame to operate according to the requirements in cutting the blank.

2. A cam profiling machine comprising a base having means for rotatably supporting a cam blank, a first cutter frame mounted for oscillation towards and away from the cam blank axis, a rotary cutter and two tracing guide-members on said first cutter frame, said guide members and cutter being shaped as solids of revolution with substantially the same radii and being disposed with their axis parallel to each other and radial to the axis of the cam blank, a second cutter frame mounted for oscillation towards and away from the cam blank axis, a further rotary cutter and two further tracing guide members on said second cutter frame, said further cutter and guide members being shaped as solids of revolution having substantially the same radii and being disposed with their axis parallel to each other and transverse to the axis of the cam blank whilst being non-copolanar therewith, a master cam contacted by one tracing guide member of each frame, at least one control cam contacted by the other tracing guide-member of each frame, means for supporting the said control cam and master cam on the axis of the cam blank, means for rotating the control cam, master cam and cam blank in unison, means for moving the cutter frames longitudinally of the cam blank axis, said control cam having a profile chosen to ensure that the cutters can be selectively prevented from cutting the cam blank to permit either or both cutters to operate according to the requirements in cutting the blank.

3. A cam profiling machine comprising a base having means for rotatably supporting a cam blank, a first cutter frame mounted for oscillation towards and away from the cam blank axis, a rotary cutter and two tracing guide-members on said first cutter frame, said guide-members and cutter being shaped as solids of revolution with substantially the same radii and being disposed with their axis parallel to each other and radial to the axis of the cam blank, a second cutter frame mounted for oscillation towards and away from the cam blank axis, a further rotary cutter and two further tracing guide-members on said second cutter frame, said further cutter and guide-members being shaped as solids of revolution having substantially the same radii and being disposed with their axis parallel to each other and transverse to the axis of the cam blank whilst being non-coplanar therewith, a master cam contacted by one tracing guide member of each frame, one control cam contacted by the other tracing guide-member of said first cutter frame, a second control cam contacted by the other tracing guide-member of said second cutter frame, means for supporting said control cams and master cam on the axis of the cam blank, means for rotating the control cams, master cam and cam blank in unison, feeding means for moving the cutter frames longitudinally of the cam blank axis, said control cams having profiles chosen to ensure that the cutters can be selectively prevented from cutting the cam blank to permit either or both cutters to operate according to the requirements in cutting the cam blank.

4. A cam profiling machine according to claim 1, in which the rotary cutter on said first cutter frame is a round nosed cutter and the rotary cutter on said second cutter frame is a cylindrical cutter.

5. A cam profiling machine according to claim 2, in which the rotary cutter on said first cutter frame is a round nosed cutter and the rotary cutter on said second cutter frame is a cylindrical cutter.

6. A cam profiling machine according to claim 3, in which the rotary cutter on said first cutter frame is a round nosed cutter and the rotary cutter on said second cutter frame is a cylindrical cutter.

CHARLES PERRY.

REFERENCES CITED

The following references are of record in the file of this patent:

UNITED STATES PATENTS

| Number | Name | Date |
|---|---|---|
| 2,397,108 | Hanna | Mar. 26, 1946 |
| 2,400,954 | Salstrom | May 28, 1946 |

FOREIGN PATENTS

| Number | Country | Date |
|---|---|---|
| 479,076 | Great Britain | Jan. 31, 1938 |
| 571,769 | Great Britain | Sept. 7, 1945 |